July 3, 1945.                E. A. JOHNSTON                2,379,805
                          AGRICULTURAL IMPLEMENT
                  Filed May 29, 1942           2 Sheets-Sheet 1
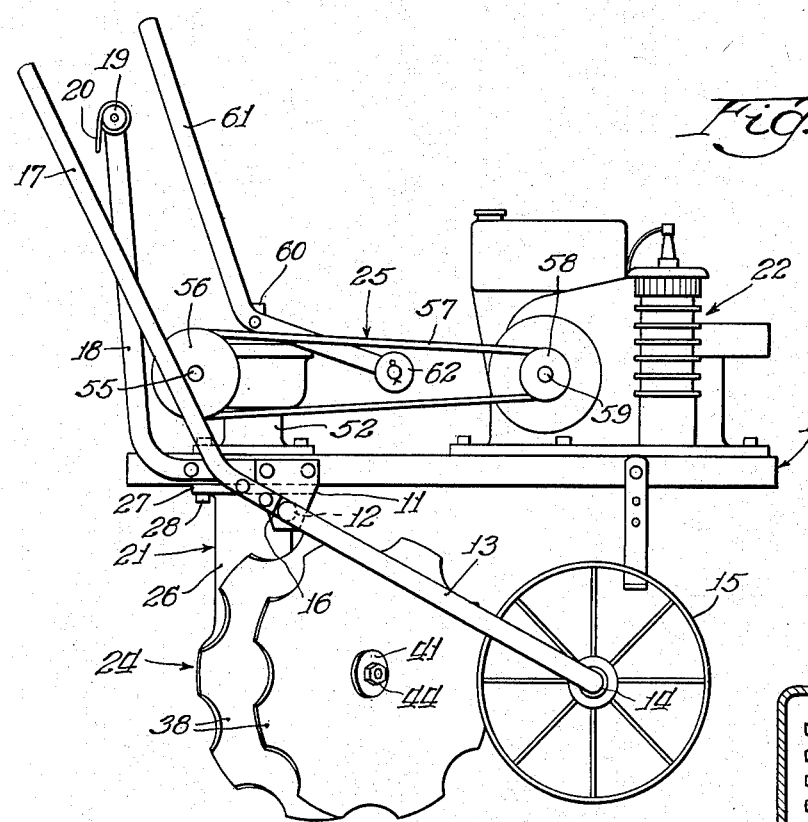
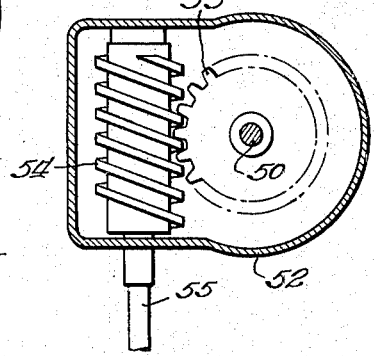
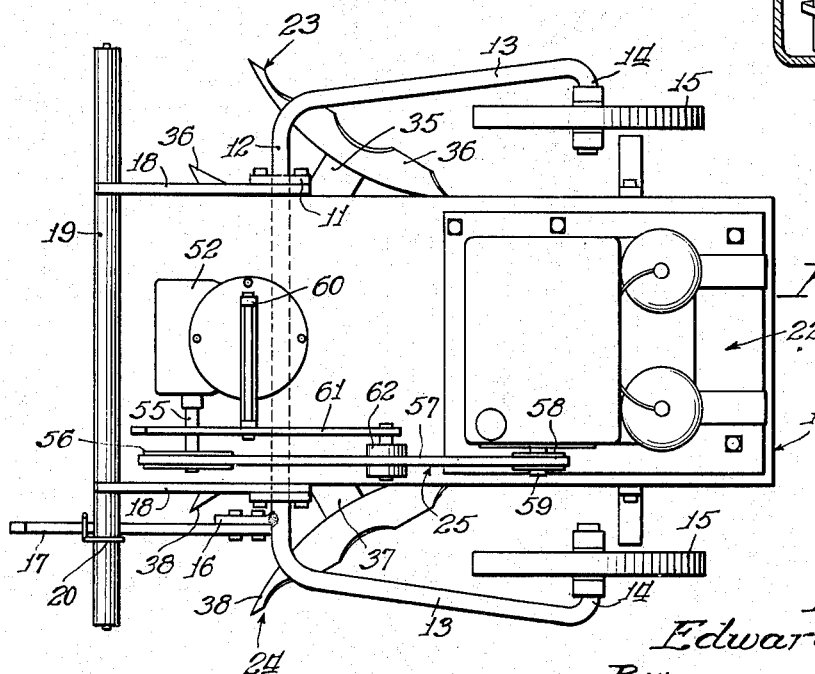
Inventor:
Edward A. Johnston
By: Paul O. Pippel
Atty.

July 3, 1945.  E. A. JOHNSTON  2,379,805
AGRICULTURAL IMPLEMENT
Filed May 29, 1942   2 Sheets-Sheet 2
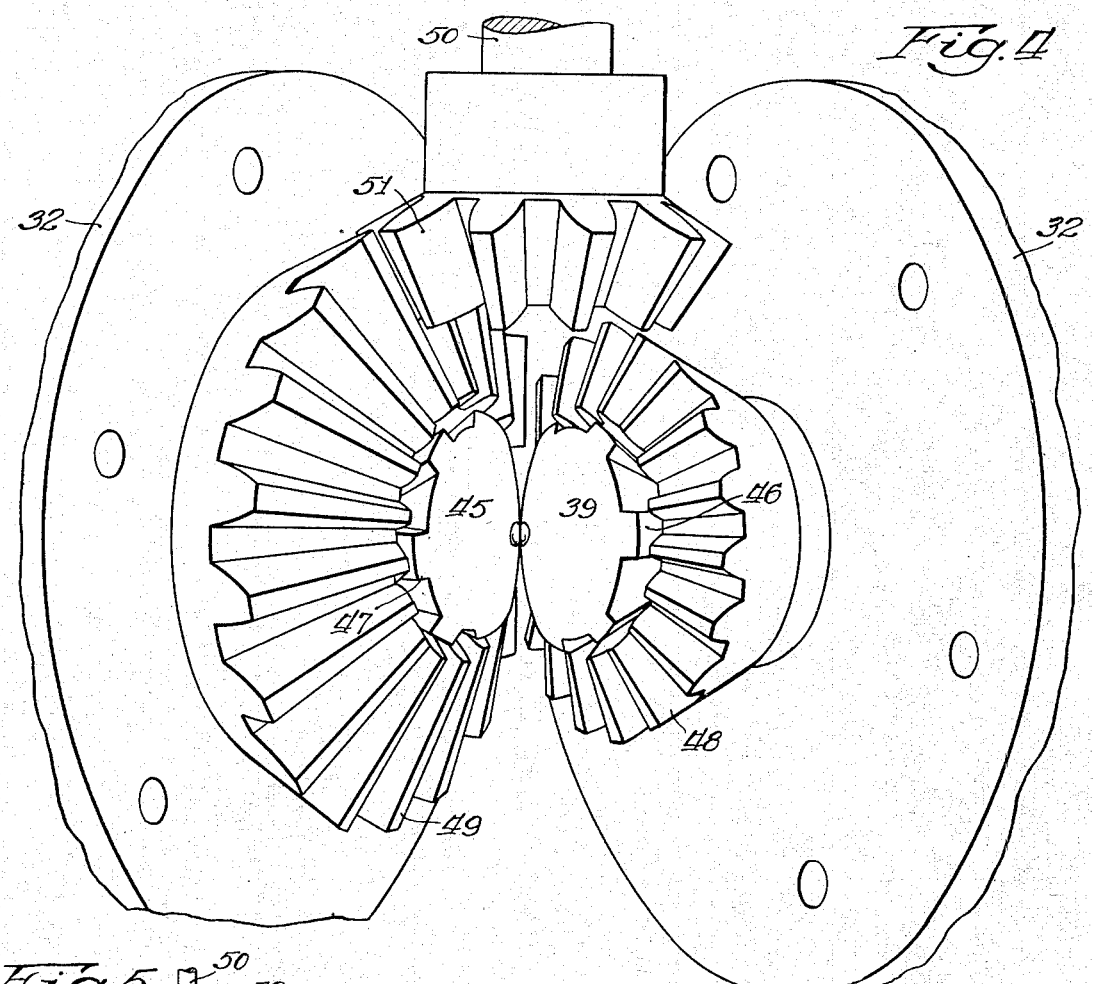
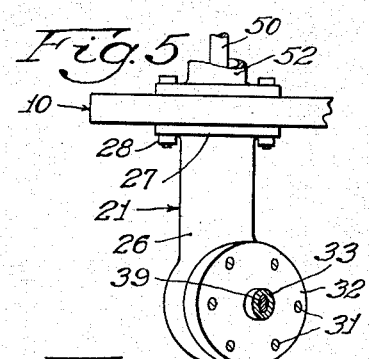
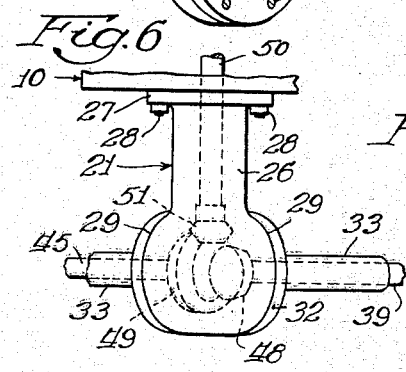
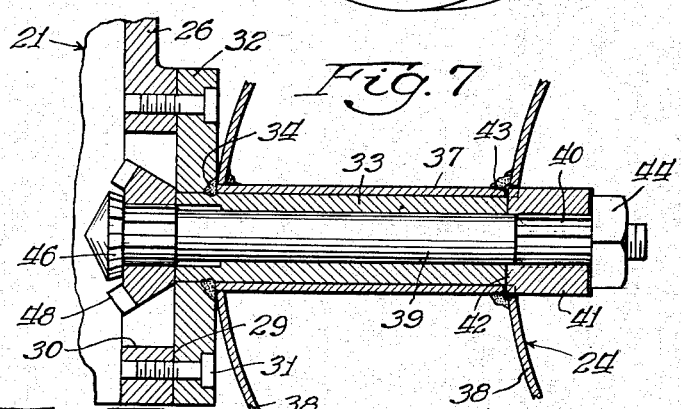
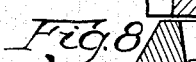
Inventor:
Edward A. Johnston
By Paul O. Pippel
Atty.

Patented July 3, 1945

2,379,805

UNITED STATES PATENT OFFICE 2,379,805

AGRICULTURAL IMPLEMENT

Edward A. Johnston, Los Angeles, Calif., assignor to International Harvester Company, a corporation of New Jersey Application May 29, 1942, Serial No. 444,967

4 Claims. (Cl. 97—34)

This invention relates to an agricultural implement and, more particularly, to a type of implement having driven means for working or tilling the soil.

A particular type of machine to which the present invention is especially adapted usually comprises a wheeled carrying frame provided with a plurality of rotatable or otherwise movable ground-working elements adapted to pulverize or otherwise cultivate the soil over which the machine is operated. In one class of such machines, the carrying frame may be drawn by a tractor or other draft vehicle. In such case, the soil-working elements may be driven by power derived from the tractor. In another class of such machines, the carrying frame may be a part of the tractor and, as before, the soil-working elements are driven from the tractor power source. In a third class of such machines, the carrying frame is adapted to be moved over the ground by means of the operation of the soil-working elements. In this instance, the frame is provided with power means in the form of a small engine which furnishes the power for driving the movable soil-tilling members. In all types of such machines problems have heretofore arisen in connection with the driving of the soil-tilling blades, especially when these blades are of the type that rotate. It is very desirable that the soil-tilling blades rotate in the same direction and at the same speed. Although this is possible, it has not heretofore been achieved without the use of complicated driving mechanism.

It is accordingly the principal object of the present invention to provide an improved driving mechanism for the movable soil-working elements of a machine of the type referred to.

A further object of the invention is to provide for adaptation of the improved driving mechanism to other and similar machines.

Another important object is to provide an improved supporting and housing means for carrying the soil-working blades and for housing the parts of the driving mechanism.

A still further and specific object is to provide the improved driving means in the form of a plurality of gears, one of which is common to two others, said gear being designed to have the same diametral pitch as the other gears.

Other important objects and desirable features of the invention will become apparent as the disclosure is more fully made.

In the drawings,

Figure 1 is a side elevational view of one form of the machine embodying the invention;

Figure 2 is a plan view of the same;

Figure 3 is an enlarged sectional view illustrating part of the driving means;

Figure 4 is a perspective view showing a portion of the driving means, particularly the bevel gearing arrangement for driving the tillers;

Figure 5 is a fragmentary view showing the unitary supporting housing, as viewed from the side;

Figure 6 is a rear view of the structure shown in Figure 5;

Figure 7 is an enlarged, fragmentary, sectional view showing the mounting of a tilling unit and its drive shaft; and Figure 8 is a detail view in section showing the relationship between two of the gears in the driving mechanism.

The particular type of machine chosen for the purposes of illustration is a manually operated rotary tiller equipped with an internal combustion engine for the driving of the rotary tilling elements. This machine comprises a generally horizontal carrying frame 10 provided adjacent its rear end with a pair of transversely spaced bearing brackets 11, which journal the transversely extending shaft 12 forming part of a crank axle structure having at its opposite ends downwardly and forwardly extending crank arms 13. These arms terminate at their lower ends in stub axles 14 and each journals thereon a carrying wheel 15. The transverse shaft part 12 has rigidly secured thereto adjacent the junction of that part and one of the arms 13 a bracket arm 16 to which is rigidly secured a rearwardly and upwardly extending operating lever 17. The frame 10 carries at its rear end a pair of upstanding supports 18, at the upper end of which is disposed a transverse pusher bar 19. This bar is adapted to be grasped by an operator who guides the machine over the ground to be operated upon. One end of the bar 19 is equipped with locking means in the form of a swinging hook 20, which is adapted to be engaged with the upper portion of the lever 17 for the purpose of locking the crank axle 12 against movement with respect to the frame 10, for a purpose that will be later described.

The general structure of the machine is completed by the provision of a depending supporting housing generally indicated at 21, a power means in the form of an internal combustion engine generally indicated at 22, a plurality of earth-working or soil-tilling elements, or blade units, 23 and 24, and driving means indicated generally at 25 for operating the soil-tilling units, as will presently appear.

As best shown in Figures 5 and 6, the supporting housing structure comprises a vertical housing portion 26 having an upper horizontal flange 27 secured by a plurality of bolts 28 to the under side of the frame 10. The lower portion of the housing 21 is provided at one side with a vertical wall 29 having an opening 30 therein. The opposite side of the housing is exactly the same as that about to be described, and it will be understood that reference characters that apply to one side apply also to the other side. The surfaces of the walls 29 are angularly related; that is, each is inclined to a vertical longitudinal plane passed through the center of the frame 10. Each wall has mounted thereon, by a plurality of capscrews 31, a circular plate member 32 forming part of a secondary housing or support. The plates 32 are secured over and close the openings 30. Each plate has rigidly secured thereto a transversely extending sleeve portion 33. The inner end of each sleeve is welded, as at 34, or otherwise rigidly secured, or formed as a part of the respective plate 32. Because of the inclination of the walls 29, as previously described, the sleeves 33 are angularly related and provide a pair of journals arranged on angularly related axes for the mounting of the tilling units 23 and 24.

The tilling unit 23 includes a sleeve 35 journaled on the sleeve 33 at that side of the supporting housing 21 and a plurality of generally transversely spaced soil-working blades 36. These blades are illustrated as circular with notched peripheries, although it will be apparent that any form of blade may be utilized. The unit 24 is similarly provided with a sleeve 37 and a plurality of rotatable elements or blades 38. As best shown in Figure 7, the sleeve 33 of the unit 24 encloses and journals a drive shaft 39. The outer end of this shaft is splined, as at 40, and has splined thereto a driving member 41 provided with a plurality of driving lugs 42 which engage a plurality of notches 43 in the outermost rotary blade 38. A nut 44 secures the parts together and provides for rotation of the sleeve 37 and blades 38 with the shaft 39. The other unit 23 is similarly arranged and constructed with respect to a drive shaft 45, as best shown in Figures 4 and 6.

The inner ends of the shafts 39 and 45 extend within and are enclosed by the lower portion of the supporting housing 21. As best shown in Figures 4 and 7, the inner ends of these shafts are splined, as at 46 and 47, respectively. The shaft 39 has splined thereto for rotation therewith a drive gear 48. This gear is in constant mesh with a gear 49 mounted on the splined end 47 of the shaft 45. The detailed description of these gears will be set forth below.

As best shown in Figures 4 and 6, the vertical portion 26 of the housing 21 journals therein a vertical driving shaft 50. This shaft carries at its lower end a gear 51 in constant mesh with the gear 49, but not meshing with the gear 48. The shaft 50 extends upwardly beyond the upper portion of the frame 10 and is enclosed in a housing 52. The shaft has keyed to its upper end a worm wheel 53 which meshes with a worm 54 driven by a transversely extending shaft 55 having its outer end disposed externally of the housing structure 52. The outer end of this shaft has keyed thereon a pulley 56, which is driven by a belt 57 trained about a second pulley 58 carried on a crank shaft 59 of the engine 22. This structure provides parts of the driving means 25 previously referred to generally. The belt 57 ordinarily slips with respect to the pulleys 56 or 58 and means are provided for tightening the belt 57, so that the engine will drive the rotary blades 36 and 38 through the gearing just described. This means takes the form of a belt tightener including a support 60 carried on the upper portion of the housing 52 and serving to mount a swingable lever 61 having a lower portion carrying an idler roller 62. Rearward swinging of the lever 61 raises the idler 62 and tightens the belt 57.

As previously stated, an improved feature of the present invention is the provision of the novel gearing arrangement by which a compact unit is provided for driving both of the tilling units 23 and 24 in the same direction of rotation and at the same speed. In the particular form of the invention illustrated, these results are accomplished by the arrangement of the gears 48, 49, and 51. As best shown in Figure 4, each of these gears is a bevel gear. The gears are so arranged that the gear 49 is common to both the gears 48 and 51. Stated another way, the gears 48 and 49 are in constant mesh and the gears 49 and 51 are in constant mesh, although there is no direct engagement between the gears 48 and 51. The particular results achieved by the construction illustrated are attained by the coordination of bevel gears having at the driving portions thereof the same diametral pitches as the gears with which they are in mesh. It will be noted that the face of the gear 49 is substantially twice as long as the face of the gear 48 and that the teeth on the gear 48 mesh with only the inner portions of the teeth on the gear 49. The diametral pitch of the gear 48 is the same as that of the inner portion of the gear 49. The outer portions of the teeth of the gear 49 mesh with the bevel gear 51. The diametral pitch of the outer portion of the gear 49 is exactly the same as that of the gear 51. For example, the gear 48 may have 18 teeth and a three-inch diameter; the diametral pitch is then 6. The gear 49 also has 18 teeth and the outermost diameter of this gear may be 4½ inches; the diametral pitch is thus 4. However, the diameter of the gear 49 is such that it includes a three-inch diameter which corresponds to the three-inch diameter of the gear 48, and thus the pitch of the inner portion of the gear 49 is 6, the same as that of the gear 48. The gear 51 may have a diameter of 2½ inches and be provided with 10 teeth, in which case its diametral pitch is 4. This corresponds exactly with the pitch of the outer portion of the gear 49. Accordingly, the shafts 39 and 45 of the tilling units 24 and 23, respectively, will be rotated in the same direction and at the same speed.

In the operation of the machine for tilling the soil, the hook 20 on the push bar 19 is disengaged from the lever 17 and the crank axle 12 is thus free to have angular movement with respect to the frame 10. The tilling units 23 and 24 thus engage the ground, and the engine 22 rotates the tilling blades 36 and 38. As previously stated, the machine is moved over the ground by the rotation of the blades 36 and 38. When it is desired to transport the machine, the lever 17 is moved toward the pusher bar 19 and the hook 20 is engaged therewith. This locks the crank axle against movement with respect to the frame and the entire machine may be lifted bodily upwardly about the axis of the wheels 15 and may thus be rolled along with the blades 36 and 38 free of the ground. The construction and operation of the machine are such as to provide an efficient unit for tilling small plots of ground. The unitary supporting structure 21 not only carries the tilling units 23 and 24 but also serves to house the driving shafts and gears for the rotary blades 36 and 38. The disposition of the flanged upper end 27 of the support 21 and its relation with the frame 10 are such as to provide for easy and quick assembly and disassembly of these parts. The tilling units 23 and 24 may likewise be easily and quickly disassembled from the support 21, since the secondary housing parts including the plates 32 and sleeves 33 may be removed from the support by the simple expedient of removing the fastening screws 31. Still further, either of the blade units comprising the sleeve 35 and blades 36, or the sleeve 37 and blades 38, may be removed from the journaling sleeves 33. The entire structure is such as to permit the efficient use and maintenance of the tiller.

Another feature of the invention lies in the detail arrangement of the inner ends of the shafts 39 and 45, which, as best shown in Figure 4, are formed as conical bearing portions that abut each other to resist end thrust on the shafts.

Certain other advantages and desirable features of the invention will suggest themselves to those versed in the art. It is to be understood, however, that the foregoing disclosure pertains to only a preferred embodiment of the invention and that numerous modifications and alterations may be made therein without departing from the spirit and scope of the invention as defined in the appended claims.

What is claimed is:

1. An agricultural implement comprising a wheeled frame, a supporting housing carried by and depending from the frame and having its lower portion provided with a pair of generally horizontally opposed openings, a driving shaft journaled in the housing and having its lower end in proximity to the aforesaid openings, driving means carried by the frame and connected to the upper end of the shaft, a bevel gear carried by the lower end of the shaft, a pair of secondary housing parts secured respectively over the openings in the supporting housings, a pair of shafts journaled respectively in said housing parts and having their outer ends extending therefrom, a bevel gear on one shaft meshing with the bevel gear on the driving shaft, a second bevel gear on the other shaft meshing with the bevel gear on the first driven shaft, and a plurality of implement means driven by the driven shafts.

2. An agricultural implement comprising a frame, a supporting housing carried by the frame and having a portion thereof provided with a pair of generally opposed openings, a driving shaft journaled in the housing and having one end in proximity to the aforesaid openings, driving means carried by the frame and connected to the upper end of the shaft, a pair of relatively angularly disposed secondary housing parts secured respectively over the openings in the supporting housings and extending laterally therefrom, a pair of shafts journaled respectively in said housing parts and having their outer ends extending therefrom, driving means connecting the inner ends of said shafts with the proximate end of the driving shaft, and a plurality of implement means driven by the driven shafts.

3. An agricultural implement comprising a wheeled frame, power means on the frame, a supporting housing carried by and depending from the frame, a driving shaft enclosed in and extending downwardly through the housing, means connecting the upper end of the shaft to the power means, a bevel gear at the lower end of the shaft and enclosed in the housing, a pair of driven shafts journaled in the lower part of the housing and extending respectively at opposite sides thereof, a bevel gear on one shaft within the housing and meshing with the first bevel gear, a bevel gear on the other shaft within the housing and meshing with the bevel gear on the first driven shaft, and a plurality of implement means associated with the extending ends of the driven shafts and driven thereby.

4. An agricultural implement comprising a wheeled frame, a supporting housing carried by and depending from the frame and having its lower portion provided with a pair of generally horizontally opposed openings, a driving shaft journaled in the housing and having its lower end in proximity to the aforesaid openings, driving means carried by the frame and connected to the upper end of the shaft, a bevel gear carried by the lower end of the shaft, a pair of secondary housing parts secured respectively over the openings in the supporting housings, a pair of shafts journaled respectively in said housing parts and having their outer ends extending therefrom and their inner ends respectively provided with bearing portions abutting each other to resist end thrust on the shafts, a bevel gear on one shaft meshing with the bevel gear on the driving shaft, a second bevel gear on the other shaft meshing with the bevel gear on the first driven shaft, and a plurality of implement means driven by the driven shafts.

EDWARD A. JOHNSTON.